Feb. 18, 1964 R. W. HUDSON 3,121,284
CAN PIERCING APPARATUS
Filed Oct. 30, 1962 2 Sheets-Sheet 2
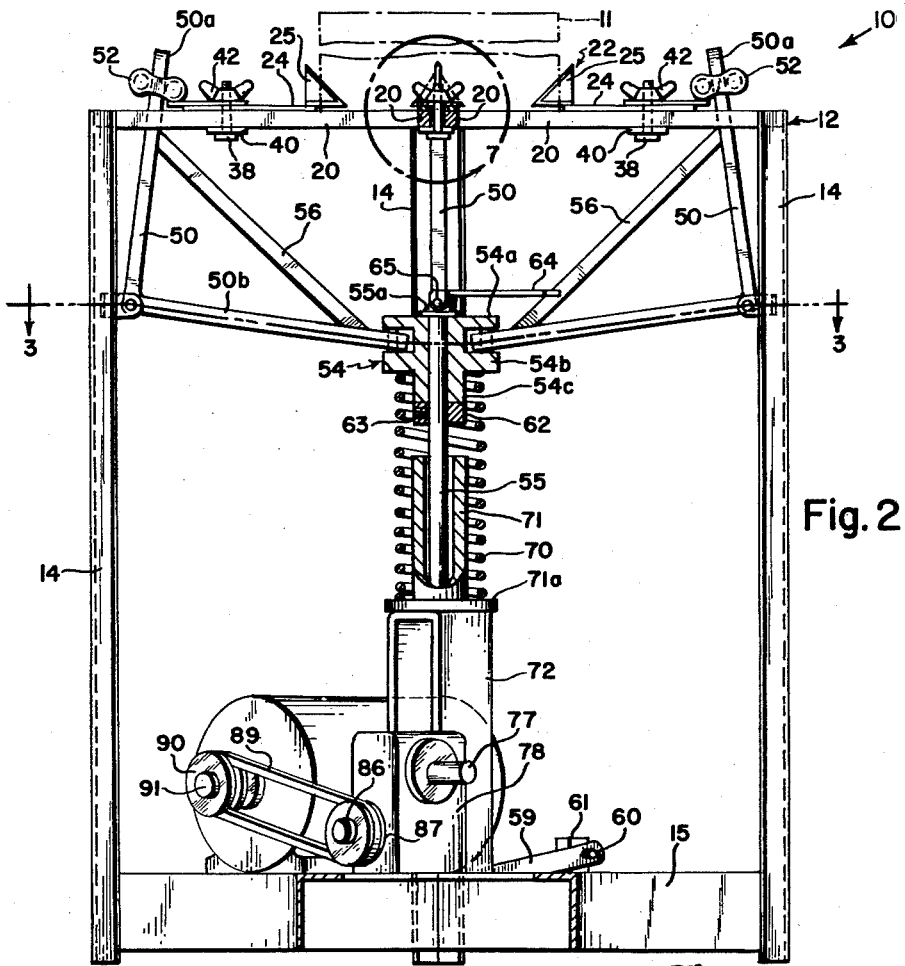
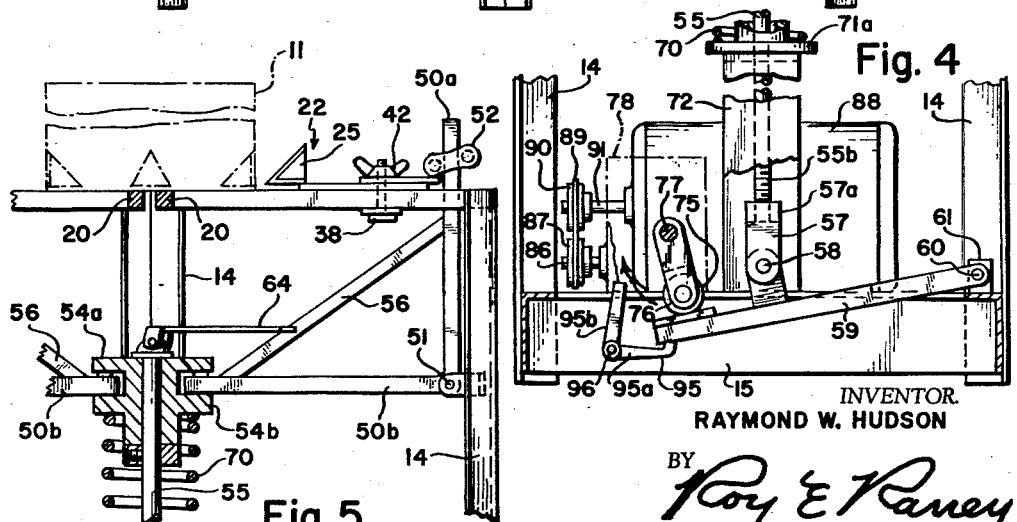
INVENTOR.
RAYMOND W. HUDSON
BY Roy E. Raney
ATTORNEY

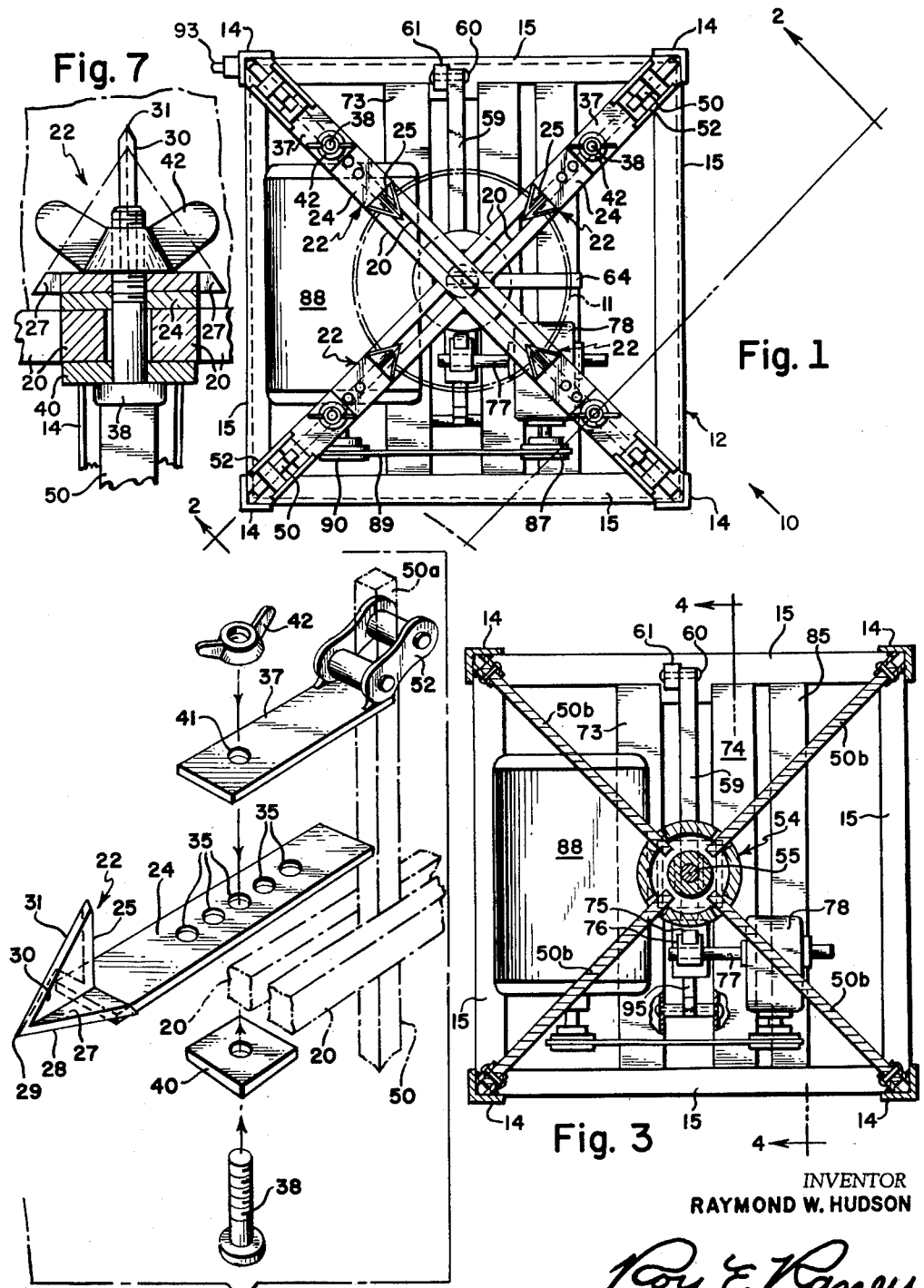

United States Patent Office 3,121,284
Patented Feb. 18, 1964

3,121,284
CAN PIERCING APPARATUS
Raymond W. Hudson, Rte. 5, Box 489, Tampa, Fla.
Filed Oct. 30, 1962, Ser. No. 234,105
2 Claims. (Cl. 30—4)

This invention relates to apparatus for forming holes in workpieces, and more particularly to an improved apparatus suitable for use in forming drainage holes in the side walls of so-called tin cans or the like, preparatory to their use as containers for growing plants, small trees, etc.

Nurseries commonly utilize emptied oil cans, fruit juice cans, egg cans, and the like, in quart, half-gallon, and larger sizes, as pots or containers for growing plants and trees from seedlings or cuttings to sizes suitable for sale or use in landscaping homes and other buildings. The cans are provided with drainage holes by piercing or cutting the side walls near the bottom to form openings distributed about the circumference of each can.

Heretofore this has been accomplished by hand with either a hammer-like tool or with a tool similar to the familiar beer can opener which has a hook for engaging the can rim and a triangular point which pierces the can and forces a triangular tab of wall material to be turned inwardly of the can. This principal has also been embodied in a hand or foot lever actuated can processing apparatus. Cans are used in this manner literally by the thousands and the piercing thereof with either type of implement is a time consuming and wearying task, even with the hand or foot lever actuated type of apparatus. Moreover, the turned in triangular tab, formed by the latter apparatus, overlies the bottom of the can, and when the plant roots grow in a circular fashion following the perimeter of the can bottom, they become lodged between the tab and the can bottom so as to defy efforts to remove the plant from the can for planting.

Accordingly, it is one important object of this invention to provide an improved apparatus for forming holes in workpieces, such as tin cans, which apparatus is driven by a suitable prime mover, preferably an electric motor, and can be used safely and efficiently by operators having no extraordinary skills, it only being necessary to place the workpiece momentarily in position on the apparatus and then to remove it.

Another important object of this invention is the provision of an improved piercing or punching apparatus that forms holes in the side walls of tin cans near the bottoms thereof and which forms a neat and clean hole without forming a tab at the lower edge thereof which would be engaged by plant roots and interfere with removal of the plant from the can.

Another object of this invention is the provision of a novel can piercing apparatus having a plurality of reciprocating blade means which are readily adjustable to accommodate cans of different sizes or diameters, and which has additional fine adjusting means for determining accurately the penetration of the blade into the can wall.

Still another object of this invention is the provision of a motor driven can piercing apparatus of the foregoing character comprising means for effectively retracting the blades from the formed holes in the event a burr or misalignment tends to cause a blade to stick in the can, or in the event a can seam is engaged by one blade, and the added resistance thereof results in binding movement of the can with respect to the blades.

In one preferred form of the invention the apparatus comprises a frame having can supporting means on which a plurality of blade means are slidably mounted for reciprocating movement toward and away from a common central point. A plurality of bell cranks are pivoted to the frame with each having one leg connected to a blade means and the other leg connected to a common pull rod. The pull rod is connected to a cam follower means in the form of a lever operated against a return spring by a rotary cam to rotate the bell cranks and slide the blade means into piercing relation to a can, the return spring acting to withdraw the blades by returning the pull rod and bell cranks to their normal or starting positions. A second or kicker lever is pivoted on the frame and is adapted to be operated by the cam into moving engagement with the cam follower lever to assist in the withdrawal of the blades from the cam in the event of sticking or binding.

The invention may be said to reside in certain constructions and arrangements of parts by which the foregoing objects and advantages are achieved, together with other objects and advantages which will become apparent from the following detailed description of a preferred embodiment of the invention, read in conjunction with the accompanying sheets of drawings forming a part of this specification, and in which:

FIG. 1 is a plan view of a can piercing apparatus embodying the invention;

FIG. 2 is a vertical sectional view taken substantially along lines 2—2 of FIG. 1;

FIG. 3 is a horizontal sectional view taken substantially along line 3—3 of FIG. 2;

FIG. 4 is a fragmentary sectional view taken along lines 4—4 of FIG. 3;

FIG. 5 is a fragmentary view similar to a portion of FIG. 2 but showing parts in different operative positions;

FIG. 6 is an exploded perspective view of elements of the apparatus illustrating their relationship; and FIG. 7 is an enlarged fragmentary view of the portion of the apparatus encircled by line 7 of FIG. 2.

In the form of the invention illustrated in the drawings and described hereinafter, there is provided a can piercing apparatus 10 which is adapted to form a series of four holes or openings in the side walls of a tin can shown in phantom at 11. The apparatus 10 comprises a frame 12 including four parallel uprights 14 joined near the lower extremities thereof by horizontal side rails 15 which are arranged in the form of a square supported at its corners by the uprights 14.

Referring to FIG. 1 each of the uprights 14 is connected at its upper end to a pair of closely spaced, horizontal, parallel rods or bars 20, which lead to the center of the apparatus. The bars 20, which are thereby arranged in the form of a cross, serve to support a workpiece such as a can 11, as shown. In addition, the bars 20 serve as track means for four reciprocating blade means generally indicated at 22. Each of the blade means 22, best illustrated in FIG. 6, includes a flat plate 24 adapted to slide directly on the upper surfaces of the corresponding bars 20 and presents a three edged blade 25 toward the center of the apparatus. The blade 25 is conveniently formed from T iron stock and comprises horizontal flukes 27 having sharpened edges 28 converging toward a point 29, and a vertical fluke 30 having a sharpened edge 31 converging with the edges 28 at point 29. The blade 25 is preferably secured to the plate 24 by welding and the flukes 27 are disposed in spaced relation to the upper surfaces of the bars 20 so as to accommodate the rim of the tin can to be pierced. The plates 24 are provided with a series of openings 35 and are secured to drive plates 37 by removable screws 38, each of which extends upwardly through a retainer plate 40, a selected opening 35 in a respective plate 24 and an opening 41 in the corresponding drive plate 37. A wing nut 42 is threadedly engaged on each screw 38 to releasably secure the plates 24 in assembled relation to the drive plates 37.

The drive plates 37 are adapted to be reciprocated along the trackways formed by the bars 20 through the agency of bell cranks 50 which are pivoted at 51 to the respective uprights 14. The bell cranks 50 comprise legs 50a the upper ends of which are connected to the drive plates 37 by extending through openings defined in connector elements 52 secured to the outer ends of the drive plates. The connector elements 52 are conveniently in the form of roller type chain links which are welded to the drive plates 37 as shown and are adapted to freely receive the upper ends of the bell crank legs 50a.

The other leg 50b of each bell crank extends radially inwardly of the apparatus and has its inner end loosely captivated between flanges 54a and 54b of a bell crank actuating member 54 which is mounted at the upper end of a pull rod 55. The legs 50a and 50b of the bell cranks are preferably braced by suitable struts 56.

The pull rod 55 is provided with a head 55a bearing against the upper surface of the actuating member 54 and is provided at its opposite end with a threaded portion 55b engaged in correspondingly threaded opening of a nut portion 57a of a clevis member 57. The clevis member 57 is pivoted as at 58 to a cam follower lever 59 which is in turn pivoted at 60 to a bracket 61 forming part of the frame 12. A collar 62 is secured to the pull rod 55 by a set screw 63 and is adapted to engage the lower side of actuator member 54 upon upward movement of the pull rod for a purpose which will presently be made apparent.

The head 55a of pull rod 55 is provided with an adjusting handle 64 which is pivoted thereto at 65 and is adapted to rotate the pull rod with respect to nut portion 57a of clevis 57 so as to adjust the effective length of the pull rod for a purpose which will also become apparent as the description proceeds.

The actuating member 54 is normally biased upwardly by a compression spring 70, the upper end of which surrounds a boss 54c and bears against the lower side of flange 54b of the actuator member. The lower end of spring 70 bears against a flange 71a of a pull rod guide member 71 which is supported by an inverted U-shaped bracket 72, the lower ends of which are mounted on spaced horizontal cross bars 73 and 74 extending between two of the side rails 15 and forming part of the frame 12.

The free end of the cam follower lever 59 is adapted to be depressed periodically by a revolving cam roller 75 which is rotatably carried at the outer end of a bifurcated arm 76 extending radially from a rotating shaft 77. The shaft 77 is driven by a suitable reduction gear means 78 which is mounted between cross bar 74 and a cross member 85. The reduction gear means 78 is provided with an input shaft 86 and pulley 87, and is driven by a suitable prime mover in the form of an electric motor 88 by a belt 89 encircling pulley 87 and a pulley 90 on an output shaft 91 of the motor. The motor 88 is conveniently mounted between the cross member 74 and the adjacent side rail 15, and is controlled by an on-off switch 93 mounted on one of the uprights 14 as illustrated in FIG. 1.

Means are provided to assist the spring 70 during the return stroke of the apparatus and this means comprises a kicker member in the form of a lever 95 which is pivoted as at 96 between the cross members 73 and 74, and has one leg 95a extending horizontally beneath the movable end of actuator lever 59. Lever 95 comprises a second leg 95b extending vertically with the upper end thereof in alignment with the plane of travel of the roller cam 75. When the lever 59 is depressed to the position illustrated in FIGS. 1–4, lever leg 95a is depressed so as to bring the upper end of leg 95b into the path of travel of the cam roller. In the event a blade means 22 jams or binds in a can 11 and spring 70 is unable to effect a return stroke of the apparatus, cam roller 75 will engage the upper end of leg 95b and cause leg 95a to kick the operating lever 59 upwardly. The kicking force will be transmitted through pull rod 55 and collar 62 thereof to the actuating member 54, bell cranks 50, and blade means 22.

During the operation of the apparatus 10 the motor is allowed to run continuously so that the cam roller 75 acts through the lever 59, pull rod 55, and bell cranks 50 to repeatedly drive the blade means 22 through work strokes toward a common central point, with the spring means 70 acting to withdraw the blade means through return strokes to the positions illustrated in FIG. 5. The speed of the motor 88 and the ratio of the gear reduction means 78 are so chosen that the blade means 22 are driven through approximately 60 work and return storkes a minute and it will be recognized that a work and return stroke will be effected during approximately one-fourth the revolution of the cam roller 75 and that there will be a period of approximately three-fourths of the revolution when the blades means will remain stationary in their retracted positions. This gives an operator time in which to remove a pierced can and to position a subsequent can on the bars 20 between the blade means. As the blade means 22 converge or move inwardly they tend to center the cans so that accurate positioning of the cans by the operator is not necessary.

As the blade means 22 are driven into the side walls of the can, the cutting edges 28 and 31 thereof, slice through the metal wall and form an opening curling inwardly the cut edges of the can metal without forming a tab overlying the bottom wall of the can. This is an important feature of the invention in that the openings are not sourrounded by metal tabs which will interfere with the removal of plants from the can.

When it is desired to form holes in cans of different diameters, it is only necessary to remove the wing nuts 42, withdraw screws 38, and replace the screws 38 through the appropriate openings 35 and replace the wing nuts. This provides a coarse adjustment by which the apparatus accommodates cans of widely differing diameters such as exists between quart cans, half gallon cans, and egg cans. A fine adjustment is provided by the threaded draw bolt 55 which can be rotated by the lever 64 to adjust the depth of penetration of the blade means 22 through or into the can walls. When this adjustment has been attained, the handle 64 is conveniently swung about its pivot 65 into a horizontal position between two of the struts 52, thereby locking the pull rod 55 against rotation.

From the foregoing detailed description of an apparatus 10 embodying this invention, it will be appreciated that there has been provided thereby a can piercing apparatus which achieves the foregoing or previously mentioned objects and advantages as well as others. It will also be appreciated that the described construction provides a particularly reliable and useful apparatus which will function for long periods of time with a minimum of maintenance.

Although the invention has been described in considerable detail with reference to a specific can piercing apparatus embodying the invention, it will be understood that the invention is not limited thereto but rather the invention includes all those changes, modifications, substitutions, and uses as are reasonably embraced by the claims hereof.

Having thus described my invention, I claim:
1. Apparatus for forming holes in the side walls of cans or the like, said apparatus comprising:
(a) a frame having workpiece supporting means,
(b) a plurality of blade means slidable along said workpiece supporting means toward and away from a common point,
(c) a plurality of bell cranks pivoted to said frame and each having one leg connected to one of said blade means,
(d) pull rod means connected to the other legs of said bell crank means,
(e) spring means connected to said frame and biasing said bell cranks and said blade means toward first positions,
(f) cam follower means connected to said pull rod means,
(g) cam means rotatable against said follower means to effect movement of said bell cranks and blade means out of said first positions toward said common point for cutting holes in a workpiece,
(h) drive means for rotating said cam means against and away from said follower means, and
(i) a kicker lever pivoted on said frame, said kicker lever being engageable by said cam means and operative thereby to cause said cam follower means to assist said spring means in moving said bell cranks and blade means toward said first positions.

2. Apparatus as defined in claim 1 and wherein said pull rod means comprises a nut member connected to said follower, a threaded rod having one end engaged in said nut member, and means pivotally connecting the other end of said rod to said other legs of said bell cranks, whereby said rod may be adjusted in said nut member to vary the effective length thereof and the stroke of said blade means.

References Cited in the file of this patent
UNITED STATES PATENTS

| | | |
|---|---|---|
| 1,219,170 | Schumann | Mar. 13, 1917 |
| 2,444,744 | Mossholder | July 6, 1948 |
| 2,496,672 | Newman | Feb. 7, 1950 |
| 2,520,068 | Seiler | Aug. 22, 1950 |
| 2,692,426 | Newsom et al. | Oct. 26, 1954 |